(12) United States Patent
Bossert

(10) Patent No.: US 10,120,195 B1
(45) Date of Patent: Nov. 6, 2018

(54) MULTI-APERTURE OPTICAL SYSTEM FOR HIGH-RESOLUTION IMAGING

(71) Applicant: National Technology and Engineering Solutions of Sandia, LLC, Albuquerque, NM (US)

(72) Inventor: David Bossert, Albuquerque, NM (US)

(73) Assignee: National Technology and Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/590,788

(22) Filed: May 9, 2017

Related U.S. Application Data

(60) Provisional application No. 62/363,518, filed on Jul. 18, 2016.

(51) Int. Cl.
| | | |
|---|---|---|
| G02B 27/10 | (2006.01) | |
| G02B 27/12 | (2006.01) | |
| G02B 27/42 | (2006.01) | |
| G02B 23/02 | (2006.01) | |
| G02B 23/00 | (2006.01) | |
| H04N 5/265 | (2006.01) | |
| G02B 5/20 | (2006.01) | |
| G02B 5/30 | (2006.01) | |
| G02B 5/18 | (2006.01) | |
| G02B 5/04 | (2006.01) | |

(52) U.S. Cl.
CPC ......... *G02B 27/1066* (2013.01); *G02B 23/00* (2013.01); *G02B 23/02* (2013.01); *G02B 27/106* (2013.01); *G02B 27/123* (2013.01); *G02B 27/4205* (2013.01); *H04N 5/265* (2013.01); *G02B 5/045* (2013.01); *G02B 5/1819* (2013.01); *G02B 5/201* (2013.01); *G02B 5/30* (2013.01)

(58) Field of Classification Search
CPC .................................................. G02B 27/1066
See application file for complete search history.

(56) References Cited

U.S. PATENT DOCUMENTS

| | | | |
|---|---|---|---|
| 5,905,591 A | 5/1999 | Duncan et al. | |
| 6,185,037 B1 * | 2/2001 | Lutz ....................... | G01C 11/02 359/399 |
| 7,009,764 B1 | 3/2006 | Sigler et al. | |
| 7,391,519 B1 | 6/2008 | Kendrick et al. | |
| 7,631,839 B1 * | 12/2009 | Duncan ................. | B64G 1/105 244/158.1 |
| 2010/0053411 A1 * | 3/2010 | Robinson ............... | G02B 26/06 348/335 |
| 2014/0198315 A1 * | 7/2014 | Priore ....................... | G01J 3/32 356/364 |
| 2016/0286199 A1 | 9/2016 | Wajs et al. | |

(Continued)

*Primary Examiner* — Cynthia Segura
(74) *Attorney, Agent, or Firm* — Medley, Behrens & Lewis, LLC; Samantha Updegraff

(57) ABSTRACT

Technologies pertaining to a multi-aperture optical imaging system are described herein. The multi-aperture optical system comprises an afocal optical telescope and a plurality of sub-apertures that receive light from the telescope. Each sub-aperture comprises a focusing optic that creates a full-field image onto an individual image sensor that outputs data indicative of an intensity of light received at the sensor. Image processing techniques can be used to combine the sensor outputs for spectral discrimination, to improve dynamic range or to enhance resolution of a scene.

20 Claims, 8 Drawing Sheets

(56) References Cited

U.S. PATENT DOCUMENTS

| | | |
|---|---|---|
| 2016/0334582 A1 | 11/2016 | Eikenberry et al. |
| 2016/0349228 A1* | 12/2016 | Kester .................. G01J 5/0896 |
| 2017/0299856 A1* | 10/2017 | Sitter, Jr. ............... G02B 23/06 |
| 2017/0302377 A1* | 10/2017 | Boroson .................. H04B 7/19 |
| 2018/0198258 A1* | 7/2018 | Chen ....................... H01S 5/405 |

* cited by examiner

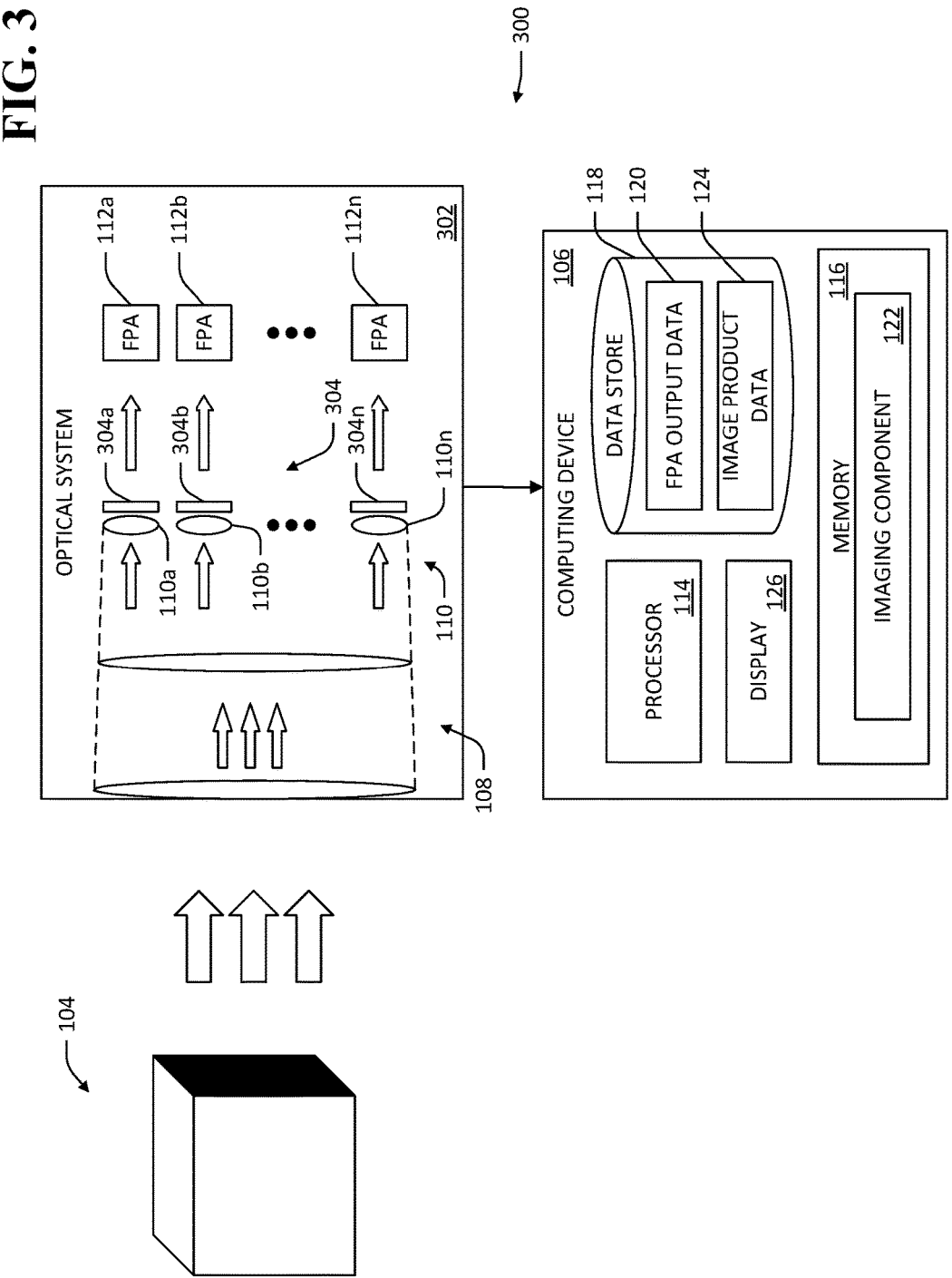

MULTI-APERTURE OPTICAL SYSTEM FOR HIGH-RESOLUTION IMAGING

RELATED APPLICATION

This application claims priority to U.S. Provisional Patent Application No. 62/363,518, filed on Jul. 18, 2016, and entitled "COMPRESSIVE SENSING SNAPSHOT SPECTROMETER", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

High resolution imagery is used in connection with many mapping, earth-monitoring, and security surveillance applications. A variety of different information can be gleaned from optical imagery, such as, for example, reflection, absorption, and emission spectra, time-variant target characteristics, depth information, etc. However, conventional techniques used to collect or derive this additional information generally require higher spatial resolution, temporal resolution, and/or dynamic range of optical detectors used in connection with imaging. Further, conventional approaches to techniques such as multispectral imaging may have disadvantages that render them unsuitable for some imaging applications. For instance, multispectral and hyperspectral imaging techniques that incorporate push-broom sampling may be unsuitable for applications in which characteristics of an imaging target change quickly over time.

SUMMARY

The following is a brief summary of subject matter that is described in greater detail herein. This summary is not intended to be limiting as to the scope of the claims.

Various technologies for a multi-aperture optical imaging system are described herein. An exemplary multi-aperture optical imaging system comprises an afocal optical telescope, comprised of two or more optical elements (e.g. mirrors and lenses), that collects light from a scene and relays the input pupil of the telescope to a desired location at a desired magnification. The multi-aperture optical imaging system further comprises an array of lenses positioned at the exit pupil of the afocal telescope. Each of the lenses in the array of lenses is configured to focus the image of the scene at a surface of a respective focal plane array (FPA) in a plurality of FPAs. Thus, each of the lenses in the array of lenses comprises a sub-aperture of the multi-aperture optical imaging system, wherein each sub-aperture views the entire field of view (FOV) of the telescope. Each of the FPAs outputs data indicative of an intensity of light received at a plurality of different pixels in the FPA. The data output by the FPAs can be used in connection with generating images of the scene.

The multi-aperture optical imaging system can further include optical components corresponding to each of the sub-apertures that can be used to discriminate between light received at each FPA. In an exemplary application of the multi-aperture optical imaging system, a different spectral filter can be positioned in front of or behind each of the lenses in the array of lenses such that light from the telescope passes through the filter before being focused by the lens onto the FPA, or after passing through the lens. Each of the FPAs receives filtered light for a substantially identical FOV. Each of the FPAs therefore outputs data indicative of an intensity of light across the same FOV for a plurality of different spectral bands, one corresponding to each filter. A computing system can then generate a multispectral image of the scene based upon the outputs of the FPAs.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 is a functional block diagram of another exemplary system that facilitates multi-spectral and hyper-spectral imaging by way of a multi-aperture optical system.

DETAILED DESCRIPTION

Figure 1:
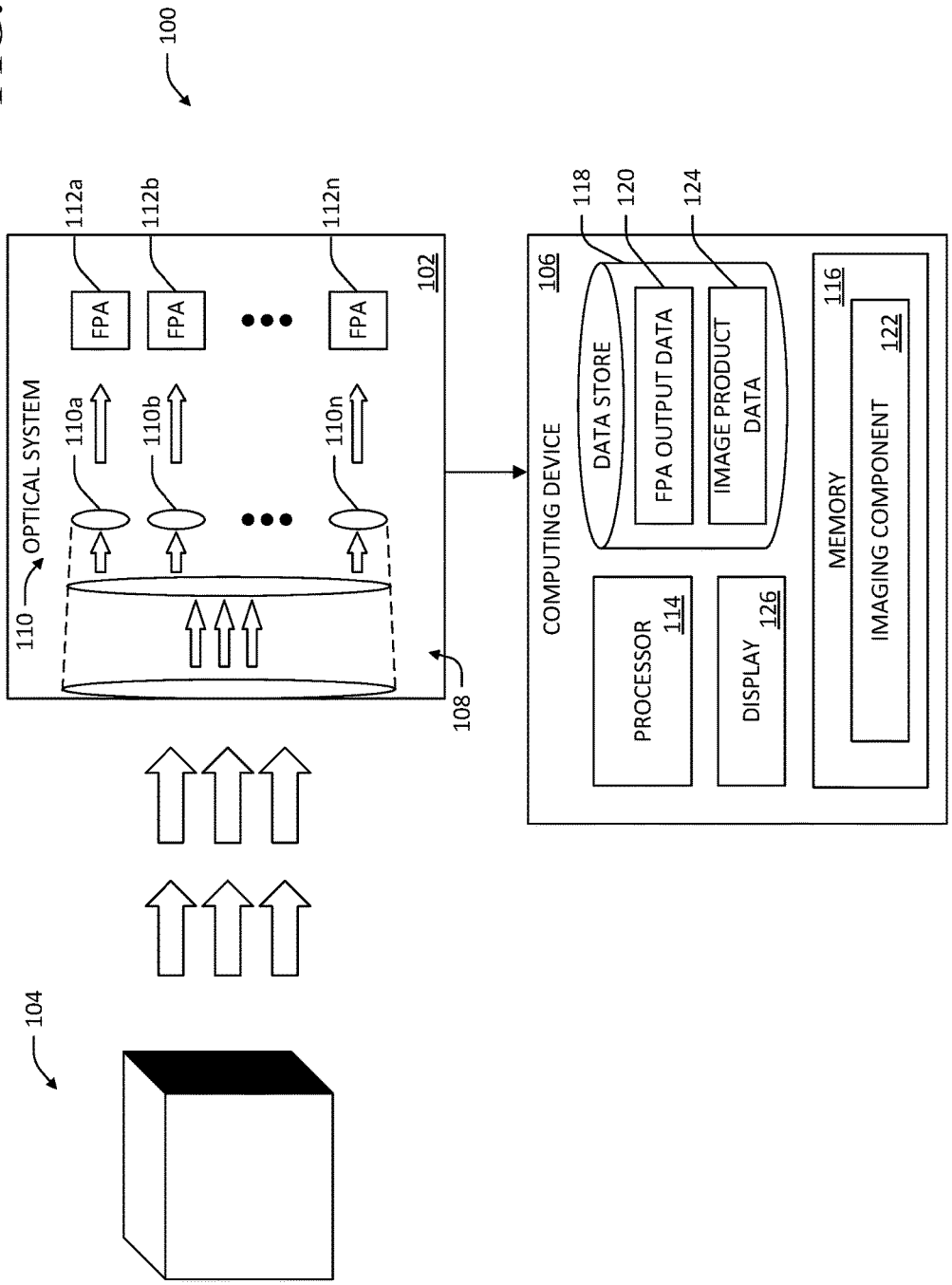
FIG. 1 is a functional block diagram of an exemplary system that facilitates multi-aperture optical imaging.

Various technologies pertaining to a multi-aperture optical imaging system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary multi-aperture optical imaging system 100 is illustrated. The system 100 includes an optical system 102 that gathers light from a scene 104 in a field of view of the optical system 102, and a computing device 106 that generates image products based upon outputs of the optical system 102. The optical system 102 comprises an optical telescope 108 that receives light from the scene 104. The optical telescope 108 comprises two or more optical elements (e.g., lenses and mirrors) that pass light to an exit pupil, wherein the light for all field angles received by the telescope 108 is present at the exit pupil. In an exemplary embodiment, the telescope 108 is an afocal telescope. The optical system 102 further includes an array of lenses 110 comprising a plurality of n lenses 110a-110n that share a substantially same field of view (FOV) determined by the telescope. The lenses 110a-110n are located at the exit pupil of the telescope 108. Thus, the lenses 110a-110n receive light for all field angles received by way of the telescope 108. The optical system 102 also includes a plurality of n focal plane arrays (FPAs) 112a-112n. The FPAs 112a-112n each comprise a plurality of optical detectors, wherein each of the detectors in an FPA comprises a pixel of the FPA. In some exemplary embodiments, the FPAs 112a-112n are substantially identical arrays (e.g., comprising a same type of optical detectors, having identical pixel counts, etc.). In other exemplary embodiments, the FPAs 112a-112n are arrays comprising detectors that have different characteristics. By way of example, the detectors in each FPA can be configured to output data indicative of an intensity of light in a different respective spectral band. In an example, a first FPA in the FPAs 112a-112n can comprise silicon-based optical detectors configured to detect light in the visible spectrum, a second FPA in the FPAs 112a-112n can comprise Indium-Gallium-Arsenide (InGaAs) detectors configured to detect infrared light, a third FPA in the FPAs 112a-112n—can comprise microbolometers configured to detect light in the long wavelength infrared (LWIR) band, etc. Each of the FPAs 112a-112n receives light from a different respective lens in the array of lenses 110. Each of the FPAs 112a-112n then outputs data indicative of an intensity of the light received from its respective lens in the lenses 110a-110n.

The data output by the FPAs 112a-112n is received by the computing device 106. The computing device 106 comprises at least one processor 114 and memory 116 comprising instructions executed by the processor 114. The computing device 106 further comprises a data store 118 that can store FPA output data 120. The memory 116 comprises an imaging component 122 that generates images of the scene 104 based upon the FPA output data 120. The FPA output data 120 includes data indicative of the output of each FPA 112a-112n. Since the FPAs 112a-112n all receive light for the substantially same FOV, the imaging component 122 can generate image products indicative of a greater amount of information than can be obtained from the output of a single FPA receiving light from a telescope having the same FOV as the telescope 108. The imaging component 122 can generate an image product pertaining to the scene 104 based upon differential characteristics of the outputs of the FPAs 112a-112n, as identified in the FPA output data 120, which is indicative of such outputs. The image product can be, for example, a multi-spectral or hyper-spectral image of the scene 104, a "super-resolved" image of the scene 104, or a phase-diversity image of the scene 104. Image products generated by the imaging component 122 can be stored in the data store 118 as image product data 124. The image product data 124 can be stored for later viewing by an analyst by way of a display 126 of the computing device 106, for future retrieval by other computing devices, etc.

Exemplary applications of the multi-aperture optical system 100 are now described. In a first exemplary embodiment, the system 100 is configured to generate a resolution-enhanced image of the scene 104 based upon correlation and interpolation of a plurality of images, each image in the plurality generated based upon the output of a single FPA in the FPAs 112a-112n. In the first exemplary embodiment, light is received from the scene 104 at the optical system 102 by way of the telescope 108. The lenses 110a-110n focus the light onto the FPAs 112a-112n, which output data indicative of an intensity of the light received for a plurality of pixels in each FPA. The computing device 106 receives the data output by the FPAs 112a-112n. The imaging component 122 generates an enhanced-resolution image by correlation and interpolation of the FPA output data for each of the FPAs 112a-112n. The resolution of the enhanced-resolution image can approach the diffraction limit associated with the optical system, with a total pixel count equal to the sum of the pixel counts for the FPAs 112a-112n. For example, if the FPAs 112a-112n consist of four FPAs each having a pixel count of 640×480 pixels, the enhanced-resolution image can have a total pixel count of approximately 1280×960 pixels.

In a second exemplary embodiment, the system 100 is configured for phase diversity imaging that improves image resolution by removing static optical aberrations produced by the imaging optics. The imaging component 122 can generate a phase diversity image that has an improved resolution as compared to an image generated based upon output of a single one of the FPAs 112a-112n. In the second exemplary embodiment, the FPAs 112a-112n are positioned so that each FPA in the FPAs 112a-112n receives light in a different sample plane near focus. The computing device 106 receives data indicative of outputs of the FPAs 112a-112n, and the imaging component 122 executes computational methods for wave field reconstruction to perform phase retrieval. The imaging component 122 then generates a phase diversity image of the scene 104 based upon results of the wave field reconstruction. The phase diversity image of the scene 104 generated by the imaging component 122 has a higher resolution than an image generated based upon output of a single FPA in the FPAs 112a-112n. The reconstruction quality of a phase diversity image generally improves as a number of sample planes increases. In the system 100, reconstruction quality of phase diversity images generated by the imaging component 122 can be increased by increasing the number of FPAs and corresponding lenses, n. Thus, in contrast with conventional phase diversity imaging systems, a reconstruction quality of phase diversity images generated by the system 100 can be improved without a need for z-scanning.

Figure 2:
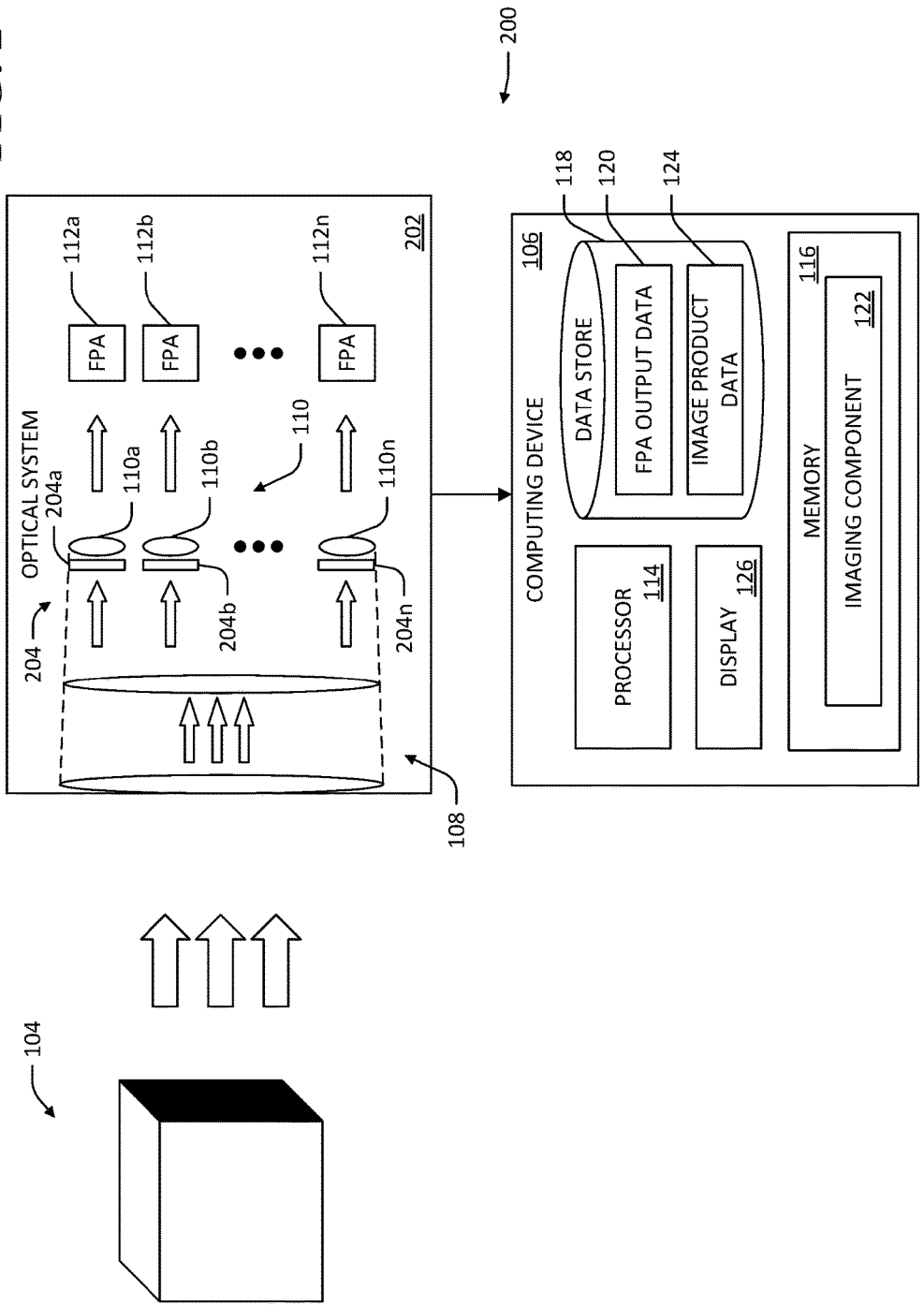
FIG. 2 is a functional block diagram of an exemplary system that facilitates multi-spectral and hyper-spectral imaging by way of a multi-aperture optical system.

Referring now to FIG. 2, an exemplary multi-aperture optical system 200 that facilitates multi-spectral imaging (MSI) and hyper-spectral imaging (HSI) is illustrated. The system 200 includes an optical system 202 that comprises the telescope 108, the array 110 of lenses 110a-110n and the plurality of FPAs 112a-112n, and further includes an array 204 of n filters 204a-204n that receives light from the telescope 108 and passes filtered light to the array 110 of lenses 110a-110n. In an example, the filters 204a-204n are spectral filters that each have different spectral transmittance functions. In another example, the filters 204a-204n can be polarization filters. The lenses 110a-110n focus the filtered light onto the FPAs 112a-112n. Each of the FPAs 112a-112n receives light for a substantially same FOV.

The computing device 106 receives data output by the FPAs 112a-112n that is indicative of an intensity of light received at the FPAs 112a-112n. Since each of the FPAs 112a-112n receives light from a different respective lens in the lenses 110a-110n, and since each of the lenses receives light from a different respective filter in the filters 204a-204n, each of the FPAs 112a-112n outputs data indicative of an intensity of light in a different spectral distribution. Further, since the FPAs 112a-112n share a common FOV, each of the FPAs 112a-112n outputs data indicative of the intensity of light in its respective spectral distribution for each of a plurality of pixels that are shared across the FPAs 112a-112n. The shared pixels correspond to portions of the scene 104 for which multiple FPAs in the FPAs 112a-112n receive light. Thus, the imaging component 122 of the computing device 106 can construct spectral images of the scene 104, wherein each pixel of a spectral image comprises data indicative of an intensity of light received from a portion of the scene 104 for a plurality of wavelengths. Spectral images generated by the imaging component 122 can be stored as the image product data 124 in the data store 118. It is further to be understood that spectral images generated by the imaging component 122 may be generated based on only those pixels corresponding to portions of the substantially same FOV of the FPAs 112a-112n for which there is data from multiple FPAs.

In one exemplary embodiment, the system 200 can be configured for MSI. In the exemplary embodiment, the filters 204a-204n are spectral bandpass filters that only pass wavelengths of light that are within a certain band of wavelengths. Each of the FPAs 112a-112n therefore receives light for the same FOV but different wavelengths of light. For example, based upon configuration of the filters 204a-204n, a first FPA can receive light for infrared wavelengths, a second FPA can receive light for visible red wavelengths, a third FPA can receive light for blue wavelengths, a fourth FPA can receive light for ultraviolet wavelengths, etc. As a result, the FPAs 112a-112n each output data indicative of an intensity of light in a different band of wavelengths for a plurality of pixels corresponding to portions of the shared FOV. The computing device 106 receives the FPA output data, and the imaging component 122 generates a multi-spectral image of the scene 104 based upon the FPA output data. The multispectral image comprises data indicative of an intensity of light received in a plurality of different wavelengths for portions of the scene 104 in the shared FOV of the FPAs 112a-112n.

In another exemplary embodiment, the system 200 can be configured for HSI. In this other exemplary embodiment for HSI, the optical elements 204a-204n are dispersive optical elements such as prisms, transmissive diffractive gratings, or other diffractive optical elements. As in the exemplary MSI embodiment described above, the FPAs 112a-112n receive light for the same FOV but different wavelengths within a data collection time. Each of the FPAs 112a-112n receives light from a lens in the lens array 110 after the light passes through one of the elements 204a-204n. The imaging component 122 receives data from each of the FPAs 112a-112n that is indicative of an intensity of light received at the FPA at the data collection time for a plurality of pixels. The imaging component 122 then generates a grating dispersed image of the shared FOV for each of the FPAs 112a-112n based upon the data received from the FPAs 112a-112n. The imaging component 122 then deconvolves spatial and spectral information from the grating dispersed images to form a (x, y, λ) HSI data cube for the shared FOV for the data collection time.

Referring now to FIG. 3, another exemplary multi-aperture optical system 300 that facilitates MSI and HSI is illustrated. The system 300 comprises an optical system 302 wherein n filters 304a-304n are positioned behind the lenses 110a-110n such that light is received from the telescope 108 by the lenses 110a-110n, whereupon the light passes from the lenses 110a-110n through the filters 304a-304n before striking the FPAs 112a-112n. It is to be understood that the exemplary system 300 is compatible with the MSI and HSI techniques described above with respect to FIG. 2.

Figure 4B:
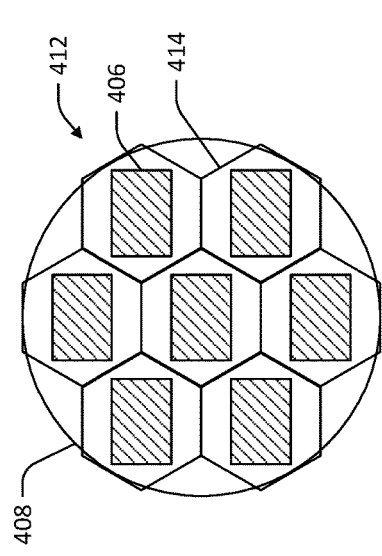
FIGS. 4A-4D are diagrams illustrating exemplary arrays of lenses in a multi-aperture optical system.
Figure 4D:
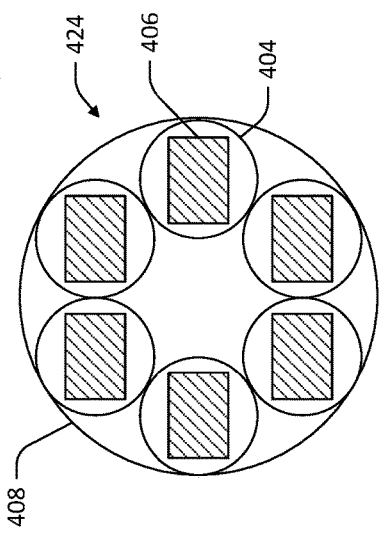
Figure 4A:
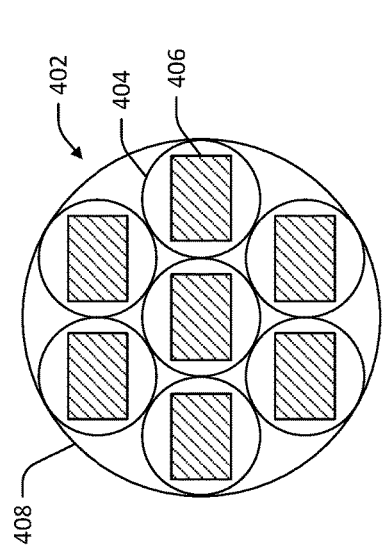
Figure 4C:
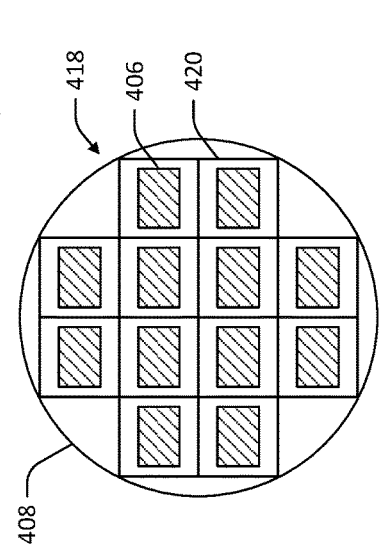

Referring now to FIGS. 4A-4D, exemplary arrays of focusing lenses and corresponding FPAs are illustrated, wherein the focusing lenses are configured to focus a same FOV onto the FPAs. Referring now to FIG. 4A, a facing view 400 of a close-packed array 402 of circular lenses 404 and accompanying FPAs 406 is shown. The array 402 of lenses 404 is positioned within an exit pupil 408 of an optical telescope that gathers light from a scene (e.g., the telescope 108 of FIGS. 1-3). The lenses 404 lie in a single plane that is coplanar with the exit pupil 408. In an exemplary embodiment, the lenses 404 are packed as closely together as possible while keeping each lens in the array 402 coplanar with the exit pupil 408. Referring now to FIG. 4B, a facing view 410 of a close-packed hexagonal array 412 of spherical lenses 414 is shown, with FPAs 406 behind each of the lenses 414. Referring now to FIG. 4C, a facing view 416 of a rectangular close-packed array 418 of spherical lenses 420 is shown, with FPAs 406 behind each of the lenses 420. Referring now to FIG. 4D, a facing view 422 of a close-packed array 424 of circular lenses 404 is shown, wherein the array 424 is for a telescope with an obstructed aperture. Thus, in the array 424, a void is left at the center of the exit pupil 408, the void corresponding to the obstructed portion telescope aperture. As in the array 402 of FIG. 4A, the lenses of arrays 412, 418, 424 are coplanar with the exit pupil 408. It is to be understood that while the exemplary arrays 402, 412, 418, 424 are shown with coplanar lenses 404, 414, 420, lenses in an array according to embodiments described herein need not be coplanar at the exit pupil of a telescope. For example, lenses in an array of lenses can be arranged on a spherical surface at the exit pupil of a telescope, such that the lenses receive light for all field angles received by the telescope.

Figure 5:
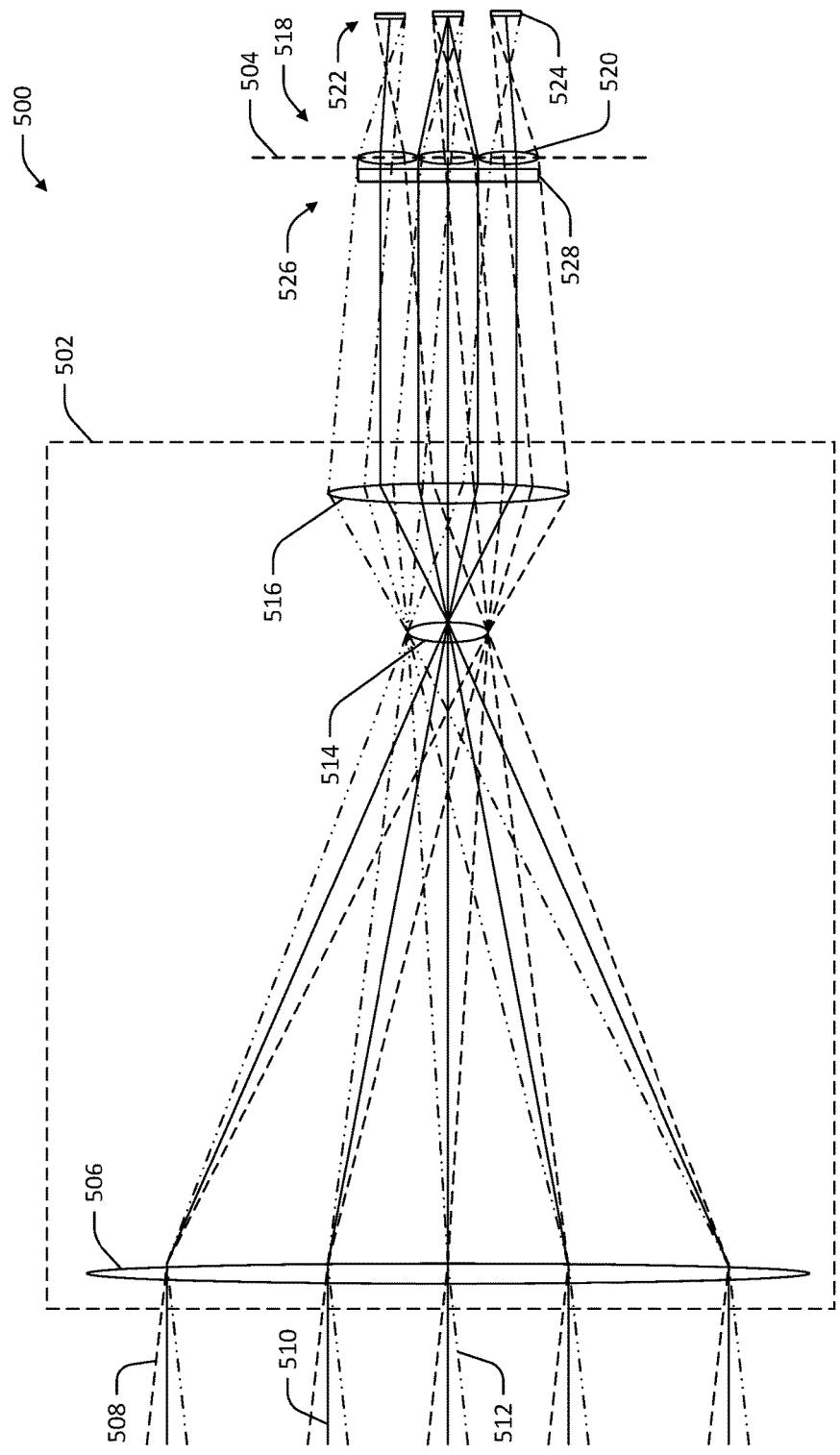
FIG. 5 is a diagram of an exemplary transmissive-optics multi-aperture optical system.
Figure 6:
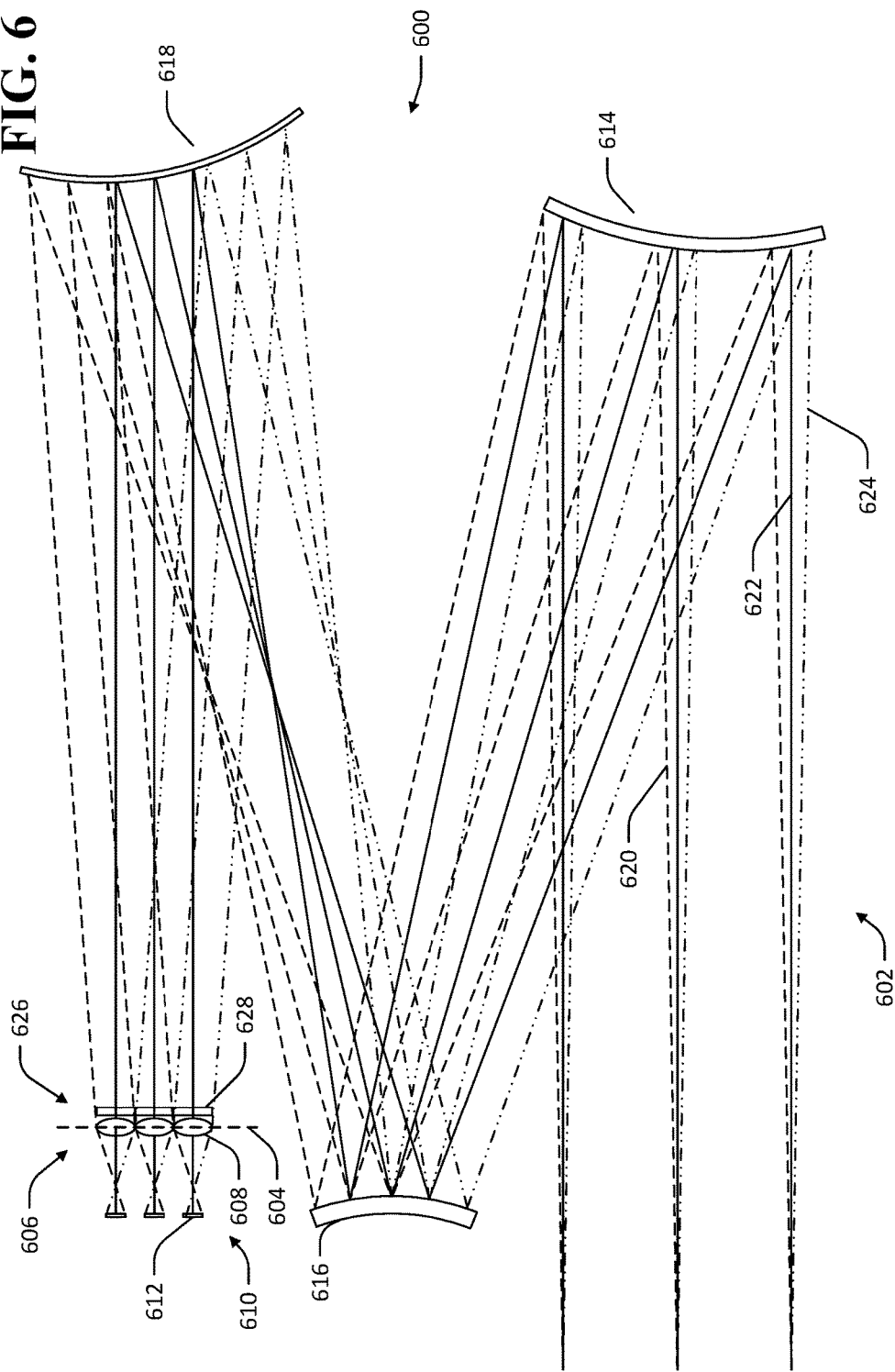
FIG. 6 is a diagram of an exemplary reflective-optics multi-aperture optical system.

Referring now to FIGS. 5 and 6, exemplary optical systems configured for use in connection with imaging technologies described herein are illustrated. For example, and referring now solely to FIG. 5, a side view of an exemplary transmissive optical system 500 is shown. The transmissive optical system 500 comprises an afocal optical telescope 502 that directs light received from a scene to an exit pupil plane 504. The telescope 502 comprises an objective lens 506 that receives light from the scene and an eyepiece 516 that recollimates the received light. Light is shown in FIG. 5 as passing through the optical system 500 from left to right for three field angles, 508, 510, 512. The telescope 502 optionally includes one or more additional optical elements 514 that are configured to position the exit pupil plane 504 to a desired position. Thus, it is to be understood that parameters of the optical telescope 502, such as distances between optical elements in the optical telescope 502, sizes of optical elements in the telescope 502, curvature of lenses in the telescope 502, etc., can be modified as design parameters for a particular application. For example, the telescope 502 can be configured to have a relatively small horizontal distance between the primary elements 506 and the exit pupil 504 in applications where the width of the optical system 500 is a limiting factor.

The optical system 500 further comprises an array 518 of lenses 520 positioned at the exit pupil 504 of the telescope 502. Thus, the lenses 520 in the array 518 receive light from all field angles received by the objective lens 506 of the telescope 502, subject to the field stop of the telescope 502 as determined by its construction. In the exemplary optical system 500, the lenses 520 are coplanar with the exit pupil 504. However, it is to be understood that in some embodiments, lenses positioned at the exit pupil of the telescope need not be arranged to be coplanar. The array 518 of lenses is configured to focus received light onto an array 522 of FPAs 524, wherein each lens in the array 518 focuses light onto a different respective FPA in the array 522. Each FPA in the array 522 therefore has a FOV corresponding to the full FOV of the telescope 502. In embodiments configured for MSI and HSI, the optical system 500 further comprises an array 526 of filters, prisms or gratings 528, wherein each filter in the array 526 filters and passes light to a different respective lens in the array 518.

Referring now to FIG. 6, a side view of an exemplary reflective optical system 600 is shown. The optical system 600 comprises an afocal telescope 602 that directs light received from a scene to an exit pupil 604. The optical system 600 further comprises an array 606 of lenses 608 that focuses light onto an array 610 of corresponding FPAs 612, wherein each lens in the array 606 focuses light onto a different respective FPA in the array 610. The optical telescope 602 comprises a primary mirror 614, a secondary mirror 616 and a tertiary mirror 618. In FIG. 6, light for three different field angles 620, 622, 624 travels from left to right before striking the primary mirror 614. The light is reflected from the primary 614 and travels from right to left to the second mirror 616. The light is then reflected from the second mirror 616, traveling left to right to the third mirror 618. The light is then reflected from the third mirror 618 and travels right to left to the exit pupil 604. In embodiments configured for MSI or HSI, the light passes through an array 626 of filters 628 before passing through the lenses at the exit pupil 604.

It is to be understood that while FIGS. 5 and 6 illustrate certain exemplary configurations of an optical system for use in connection with technologies described herein, other configurations are possible. For example, the optical systems 102, 202, and 302 can comprise Schmidt-Cassegrain telescopes, wherein the lens array 110 is positioned at an exit pupil of a Schmidt-Cassegrain telescope. In the Schmidt-Cassegrain example, pupil relaying optics can be used to position an exit pupil at a location where the lens array 110 is desirably located. In another example, the optical systems 102, 202, and 302 can be implemented as a fisheye optical system, wherein a negative mirror collects light over a FOV approaching 180 degrees.

Figure 7:
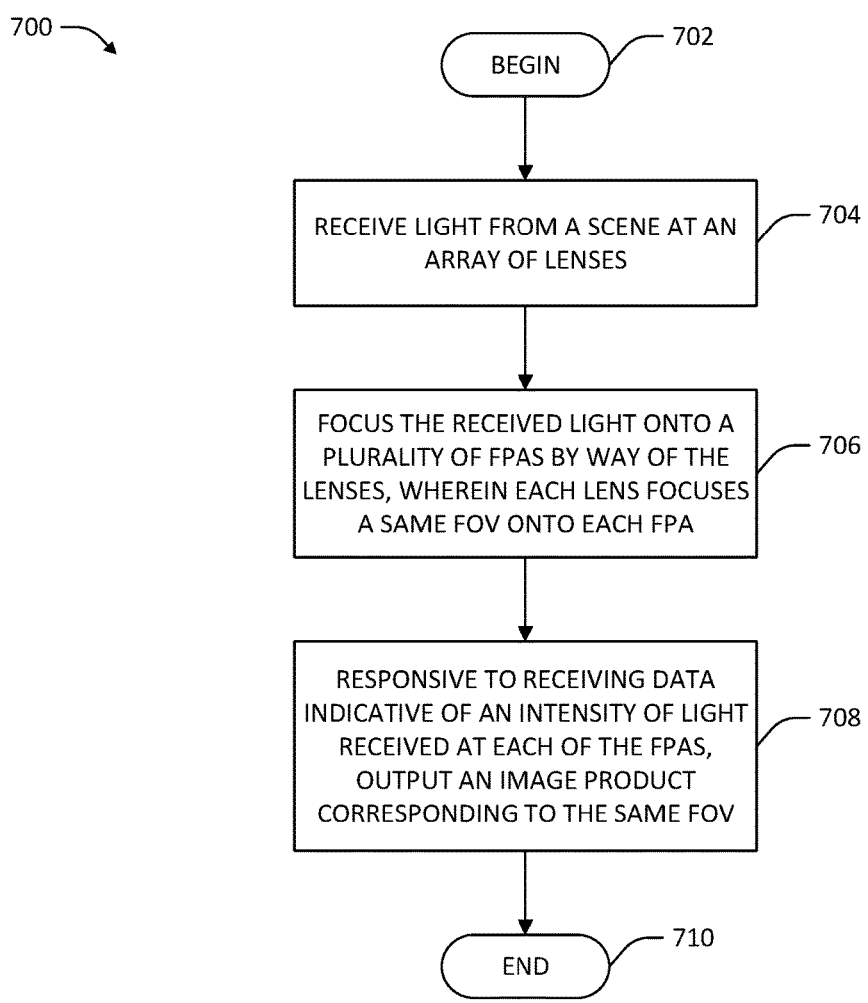
FIG. 7 is a flow diagram that illustrates an exemplary methodology for imaging in connection with a multi-aperture optical system.

FIG. 7 illustrates an exemplary methodology relating to employing a multi-aperture optical system in connection with generating images of a scene. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 7, a methodology 700 that facilitates generating images based upon data output by a multi-aperture optical system is illustrated. The methodology 700 begins at 702, and at 704 light is received from a scene at an array of lenses. Light is directed to the array of lenses by an optical telescope, and the array of lenses are located at an exit pupil of the optical telescope. At 706, the received light is focused onto a plurality of FPAs by way of the lenses, wherein each lens focuses a same FOV onto a different FPA in the FPAs (e.g., the FOV of the optical telescope). Responsive to receiving light, each FPA outputs data indicative of an intensity of the light that it receives. At 708, responsive to receiving data indicative of an intensity of the light received at each of the FPAs at a computing device, an image product corresponding to the same FOV of the FPAs is output by the computing device, whereupon the methodology 700 ends 710.

Figure 8:
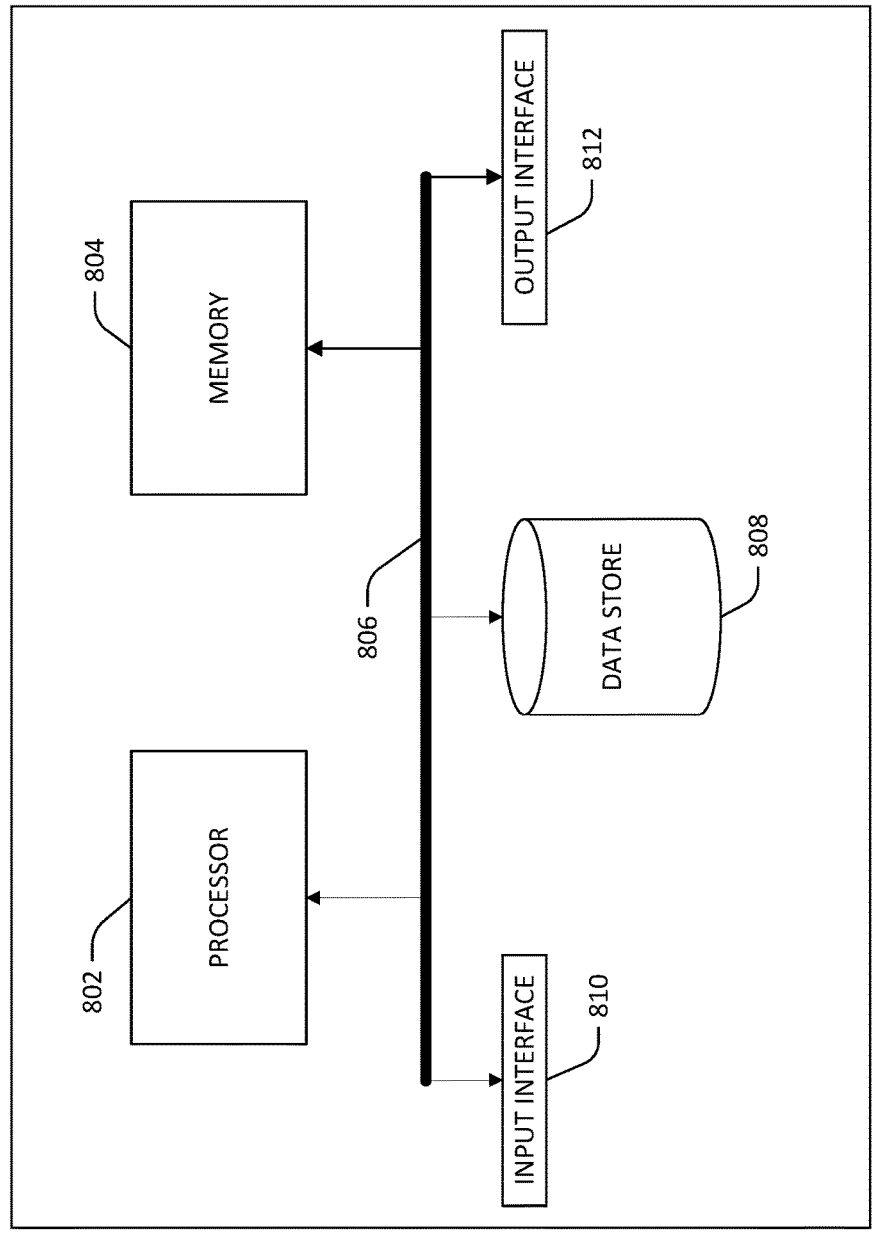
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that receives and stores data output by FPAs in optical systems described herein. By way of another example, the computing device 800 can be used in a system that generates image products based upon data output by FPAs in optical systems described herein. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store FPA output data, image product data, etc.

The computing device 800 additionally includes a data store 808 that is accessible by the processor 802 by way of the system bus 806. The data store 808 may include executable instructions, FPA output data, image product data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices.

For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An imaging system, comprising:
   an optical telescope;
   an array of lenses located at an exit pupil of the telescope; and
   a plurality of focal plane arrays (FPAs), each FPA configured to receive light from a respective lens in the array of lenses, wherein each lens in the array of lenses is configured to focus an image of a same field of view (FOV) at a respective FPA in the FPAs, and wherein each FPA is configured to output data indicative of an intensity of light received at the FPA.

2. The imaging system of claim 1, further comprising an array of filters, each of the lenses in the array receiving light from a respective filter in the array of filters.

3. The imaging system of claim 2, wherein each FPA outputs data indicative of an intensity of light in a different respective spectral band.

4. The imaging system of claim 2, further comprising a computing system configured to output multispectral image data based upon outputs of the FPAs.

5. The imaging system of claim 2, wherein the filters in the array of filters are polarization filters.

6. The imaging system of claim 2, the imaging system further comprising a computing system that generates image data based upon outputs of the FPAs, wherein the array of filters comprises a plurality of optical elements, each of the optical elements being one of:
   a transmissive diffraction grating;
   a dispersive prism; or
   a bandpass filter; and
   wherein the computing system is configured to generate hyperspectral imaging (HSI) data based upon the outputs of the FPAs.

7. The imaging system of claim 1, further comprising an array of filters, wherein each of the filters in the array of filters receives light from a respective lens in the array of lenses.

8. The imaging system of claim 7, wherein each filter in the array of filters has a different spectral transmittance function.

9. The imaging system of claim 1, each lens in the array of lenses configured to focus an image of a full FOV of the telescope at a respective FPA in the FPAs.

10. The imaging system of claim 1, the telescope comprising a reflective optics telescope.

11. The imaging system of claim 1, the telescope comprising a transmissive optics telescope.

12. The imaging system of claim 1, the telescope comprising an afocal telescope.

13. A method, comprising:
receiving light from a scene at an array of lenses, the light directed to the array of lenses by an optical telescope, the array of lenses located at an exit pupil of the telescope;
focusing the received light on a plurality of focal plane arrays (FPAs) by way of the array of lenses, wherein each lens in the array of lenses focuses the light onto a different respective FPA in the FPAs, wherein each lens focuses an image of a same field of view (FOV) onto its respective FPA, and wherein each FPA is configured to output data indicative of an intensity of light received at the FPA; and
responsive to receiving the data indicative of the intensity of light received at each of the FPAs at a computing device, outputting an image product corresponding to the same FOV by way of the computing device.

14. The method of claim 13, wherein the image product comprises an enhanced-resolution image of the scene, wherein a resolution of the enhanced-resolution image is greater than a resolution of a single FPA.

15. The method of claim 14, wherein the enhanced resolution image of the scene is output based upon application of phase diversity techniques over the data output by the FPAs.

16. The method of claim 13, wherein the light from the scene passes through an array of filters before being received at the lenses, each lens in the array of lenses receiving light from a different filter in the array of filters.

17. The method of claim 16, wherein the image product comprises a multispectral image of the scene.

18. The method of claim 16, wherein the image product comprises a hyperspectral image of the scene.

19. An optical system comprising:
an optical telescope that receives light from a scene;
an array of optical filters that receives light from the optical telescope;
an array of lenses located at an exit pupil of the optical telescope, wherein the lenses receive filtered light from the filters; and
a plurality of focal plane arrays (FPAs), each FPA configured to receive light from a respective lens in the array of lenses, wherein each lens in the array of lenses is configured to focus an image of a same field of view (FOV) at a respective FPA in the FPAs, and wherein each FPA is configured to output data indicative of an intensity of light received at the FPA.

20. The optical system of claim 19, wherein the each FPA in the FPAs comprises detectors configured to output data indicative of an intensity of light received at the FPA in a different respective spectral band.

* * * * *